(12) United States Patent
Yamanaka et al.

(10) Patent No.: US 7,986,481 B2
(45) Date of Patent: Jul. 26, 2011

(54) MAGNETIC REPRODUCING METHOD FOR SUPPRESSING LOW TEMPERATURE NOISE

(75) Inventors: Noboru Yamanaka, Tokyo (JP); Susumu Nagatsuka, Tokyo (JP); Yoshihiro Kudo, Tokyo (JP); Eric Cheuk Wing Leung, Hong Kong (CN); Chris Chiu Ming Leung, Hong Kong (CN); Leo Wai Kay Lau, Hong Kong (CN); Charles Kin Chiu Wong, Hong Kong (CN)

(73) Assignees: TDK Corporation, Tokyo (JP); SAE Magnetics (H.K.) Ltd., Hong Kong (CN)

( * ) Notice: Subject to any disclaimer, the term of this patent is extended or adjusted under 35 U.S.C. 154(b) by 810 days.

(21) Appl. No.: 11/835,927

(22) Filed: Aug. 8, 2007

(65) Prior Publication Data

US 2008/0049352 A1 Feb. 28, 2008

(30) Foreign Application Priority Data

Aug. 24, 2006 (JP) ................................ 2006-227848

(51) Int. Cl.
*G11B 5/02* (2006.01)

(52) U.S. Cl. .............. 360/59; 360/31; 360/62; 360/313; 360/324.2

(58) Field of Classification Search .......................... None
See application file for complete search history.

(56) References Cited

U.S. PATENT DOCUMENTS

| 5,726,838 | A | * | 3/1998 | Soeya et al. .............. 360/327.32 |
|---|---|---|---|---|
| 5,768,067 | A | * | 6/1998 | Saito et al. .............. 360/327.32 |
| 5,932,343 | A | * | 8/1999 | Hayashi et al. .............. 428/332 |
| 5,991,113 | A | * | 11/1999 | Meyer et al. ................ 360/75 |
| 6,157,526 | A | * | 12/2000 | Watanabe et al. ........ 360/324.12 |
| 6,256,863 | B1 | * | 7/2001 | Saito et al. ................. 29/603.08 |
| 6,407,892 | B2 | * | 6/2002 | Shiroishi ..................... 360/317 |
| 6,587,295 | B1 | * | 7/2003 | Kiyono et al. ................. 360/53 |
| 7,035,031 | B2 | * | 4/2006 | Kim et al. ..................... 360/69 |
| 7,068,468 | B2 | * | 6/2006 | Kamijima ..................... 360/128 |
| 7,117,399 | B2 | * | 10/2006 | Song ........................... 714/704 |

(Continued)

FOREIGN PATENT DOCUMENTS

| JP | A 6-84116 | 3/1994 |
|---|---|---|
| JP | A 2002-133621 | 5/2002 |
| JP | A 2004-234792 | 8/2004 |

OTHER PUBLICATIONS

U.S. Appl. No. 11/753,836, filed May 25, 2007, Takumi Uesugi et al.
U.S. Appl. No. 11/835,049, filed Aug. 7, 2007, Noboru Yamanaka et al.

*Primary Examiner* — Dismery Mercedes
(74) *Attorney, Agent, or Firm* — Oliff & Berridge, PLC (57) ABSTRACT

Provided is a magnetic reproducing method that enables a thin-film magnetic head including a head element for reading data signals which has a noise in its output due to a low temperature to bring out an excellent read characteristic in which the noise is suppressed even under the use environment with the low temperature. The magnetic reproducing method comprises the steps of: heating a head element for reading data signals which has a noise in its output due to a low temperature; and performing a read operation by using the head element for reading data signals under condition that the head element is increased in temperature.

8 Claims, 10 Drawing Sheets

U.S. PATENT DOCUMENTS

| | | | |
|---|---|---|---|
| 7,133,254 B2 * | 11/2006 | Hamann et al. | 360/125.74 |
| 7,199,960 B1 * | 4/2007 | Schreck et al. | 360/75 |
| 7,212,361 B1 * | 5/2007 | Pederson et al. | 360/31 |
| 7,224,553 B2 * | 5/2007 | Sasaki et al. | 360/128 |
| 7,391,590 B2 * | 6/2008 | Matono et al. | 360/125.32 |
| 7,417,820 B2 * | 8/2008 | Otsuki et al. | 360/75 |
| 7,545,595 B2 * | 6/2009 | Hamaguchi et al. | 360/59 |
| 7,872,471 B2 * | 1/2011 | Yamanaka et al. | 324/210 |
| 2004/0027709 A1 * | 2/2004 | Hamaguchi et al. | 360/59 |
| 2004/0264066 A1 * | 12/2004 | Shimizu et al. | 360/324.1 |

\* cited by examiner

MAGNETIC REPRODUCING METHOD FOR SUPPRESSING LOW TEMPERATURE NOISE

PRIORITY CLAIM

This application claims priority from Japanese patent application No. 2006-227848, filed on Aug. 24, 2006, which is incorporated herein by reference.

BACKGROUND OF THE INVENTION

1. Field of the Invention

The present invention relates to a magnetic reproducing method for reading data signals from a magnetic recording medium such as a magnetic disk by using a thin-film magnetic head.

2. Description of the Related Art

Most of the thin-film magnetic heads currently provided in magnetic recording and reproducing apparatuses such as magnetic disk drive apparatuses and magnetic tape drive apparatuses use a highly sensitive magnetoresistive (MR) effect element. The MR effect element has an output that does not depend on the relative velocity to a magnetic recording medium to read data signals from a magnetic recording medium such as a magnetic disk or a magnetic tape.

A problem with such conventional MR effect elements is that defective products that generate Barkhausen noise in their outputs are produced. The Barkhausen noise is generated primarily because a magnetic domain wall is caught in defects in the magnetic film constituting the MR effect element as the magnetic domain wall moves, and is affected substantially by stress applied to the MR effect element. In practice, when an external or internal stress that exceeds a certain amount is applied, inverse magnetostriction disperses the magnetization in the MR effect element to destabilize the structure of the magnetic domains, making it more likely to cause Barkhausen noise. Such a stress can be caused by a distortion of the structure of the element itself as well as the increase of deformation by the thermal expansion associated with the increase in temperature of the element.

The influence of temperature has become more remarkable than ever before especially in recent current-in-plane (CIP) giant magnetoresistive (GMR) effect elements, current-perpendicular-to-plane (CPP) GMR effect elements, or tunnel magnetoresistive (TMR) effect elements, which sense signal magnetic fields with extremely high sensitivities.

Furthermore, in order to stably control the flying height of a thin-film magnetic head, which is set to an ultra-small value in a recent magnetic disk drive apparatus, a technique has come into adoption in which a heating element is provided within a thin-film magnetic head and the end of the head element is caused to be protruded in the direction of the magnetic disk by the heat generated by the heating element to adjust the flying height (see, for example, U.S. Pat. No. 5,991,113). With this technique, thermal asperities and crashes are avoided to maintain good read and write characteristics. However, the heat generated by such a heating element further heats the MR effect element and portions around the MR effect element, and can further increase the influence of the temperature variation.

Approaches to preventing the Barkhausen noise in MR effect elements, which is likely to receive a significant influence of the temperature variation, have been proposed. For example, Japanese Patent Publication No. 2002-133621A proposes a method for determining whether an MR effect element is acceptable or defective by measuring noise generated in response to various values of sense currents flowing through an MR effect element. Here, in this method with a larger sense current, the determination is performed under the condition of a high temperature because the temperature of the MR effect element inevitably becomes high. Further, Japanese Patent Publication No. 06-84116A discloses a technique that gradually increases a sense current passed through an MR effect head to prevent the formation of a magnetic domain structure that is likely to generate noise due to a stress or the like caused by a rapid change in temperature.

However, it has been significantly difficult to solve the problem of noise generated under a low temperature with the related art described above.

Recently, magnetic recording and reproducing apparatuses, especially magnetic disk drive apparatuses, are mounted extensively as storage memories for storing large volumes of data such as audio/video data, to mobile devices that are often used out of doors such as notebook-size computers or cellular phones. As a result, the apparatuses are used in a rather wide temperature range of the use environment. Especially, in some cases, normal performance of the apparatus is required to be guaranteed even at an extremely low temperature, for example, such as −30° C. (degree Celsius).

However, some thin-film magnetic heads actually manufactured have a noise such as Barkhausen noise that exceeds the allowable number in the output under such a low temperature. Here, in order to screen such heads with significant noise, there has been no other way than that the output characteristic at the low temperature of the head is measured under the condition that the head flies on a magnetic disk after completing the head gimbal assembly (HGA) production by attaching the head to a suspension. That is, it has been significantly difficult that a head to generate a noise in such a low temperature is predicted. As a result, in the case that a head is determined as a defective one, the value-added whole HGA including the head must be discarded. Therefore, the loss per defective head becomes large, which is likely to bring an increase in cost of production.

Further, even if the sense currents are used for screening defective heads as described in Japanese Patent Publication No. 2002-133621A, only the output characteristic of the head under a high temperature can be evaluated. The same applies to the technique described in Japanese Patent Publication No. 06-84116A, and therefore, the noise generation in a low temperature has ever been problematic.

BRIEF SUMMARY OF THE INVENTION

Therefore an object of the present invention is to provide a magnetic reproducing method that enables a thin-film magnetic head including a head element for reading data signals which has a noise in its output due to a low temperature to bring out an excellent read characteristic in which the noise is suppressed even under the use environment with the low temperature.

Before describing the present invention, terms used herein will be defined. In a multilayer structure of an element formed on the element formation surface of a substrate, a component located closer to the substrate than a layer is referred to as being located "under" or "below" that layer, and a component that is located on the stacking direction side of a layer is referred to as being located "on" or "above" that layer. For example, "a lower magnetic pole layer is located on an insulating layer" means that the lower magnetic pole layer is located on the stacking direction side of the insulating layer.

According to the present invention, a magnetic reproducing method is provided, which comprises the steps of: heating a head element for reading data signals which has a noise in its output due to a low temperature; and performing a read operation by using the head element for reading data signals under condition that the head element is increased in temperature.

In the above-described magnetic reproducing method, the head element for reading data signals which has a noise in its output due to a low temperature is appropriately increased in temperature by, for example, using a heating means provided within the head. As a result, the noise is suppressed, and thus, an excellent read characteristic can be obtained even under the use environment with the low temperature. Therefore, the error rate of the magnetic recording and reproducing apparatus is reduced in the use environment with the low temperature, and improved is the reliability of the apparatus.

In the magnetic reproducing method according to the present invention, the head element for reading data signals is preferably an MR effect element, and more preferably a TMR effect element. And the head element for reading data signals is preferably heated by generating heat from a heating element provided within a thin-film magnetic head comprising the head element for reading data signals. Further, a heater provided for adjusting a flying-height may also act as the heating element.

Further, the heating element is preferably provided between a head element for writing data signals comprised by the thin-film magnetic head and the head element for reading data signals. In this case, the efficiency of temperature rise of the head element for reading data signals with respect to supplied power to the heating element will become higher. Therefore, the temperature of the MR effect element can reach a predetermined value with lower supplied power.

Further, in the magnetic reproducing method according to the present invention, the head element for reading data signals is preferably heated while a thin-film magnetic head comprising the head element for reading data signals is flying above a rotating magnetic recording medium. In this mode, it is also preferable that an output of the head element for reading data signals is measured, and the head element for reading data signals is heated until a bite error rate in the measured output becomes less than or equal to a predetermined threshold. By using the just-described mode, a desired reduction of the bite error rate can be realized surely.

Further, in the magnetic reproducing method according to the present invention, a temperature before heating of the head element for reading data signals is preferably in a range from a lower limit of operating temperature to 5° C. And a temperature reached due to heating of the head element for reading data signals is preferably in a range from 10° C. to 30° C.

According to the present invention, a magnetic recording and reproducing apparatus is further provided, which comprises at least one thin-film magnetic head which comprises:
an MR effect element for reading data signals; and
a heating means for heating the MR effect element to increase a temperature of the MR effect element and suppress a noise due to a low temperature occurring in an output of the MR effect element.

In the above-described magnetic recording and reproducing apparatus, the heating element is preferably provided between the electromagnetic coil element provided in the thin-film magnetic head and the MR effect element.

Further, in the magnetic recording and reproducing apparatus according to the present invention, it is preferable that the magnetic recording and reproducing apparatus further comprises:
at least one magnetic recording medium;
an error/noise measuring means for measuring an error rate or noise in an output from the MR effect element;

a heating-element control means for supplying electric power to the heating element to control an amount of heat applied to the MR effect element; and
a control means for controlling the error/noise measuring means and the heating-element control means to operate in conjunction with each other, in order to measure an error rate or noise occurring in an output of the MR effect element heated by the heating element while the thin-film magnetic head is flying above the rotating magnetic recording medium.

Further, in the magnetic recording and reproducing apparatus according to the present invention, the MR effect element is a TMR effect element.

Further objects and advantages of the present invention will be apparent from the following description of preferred embodiments of the invention as illustrated in the accompanying drawings.

BRIEF DESCRIPTION OF THE SEVERAL VIEWS OF THE DRAWINGS

FIG. 3b shows a perspective view including the A-A cross-section of FIG. 3a;

FIGS. 8a1 to 8b2 show graphs illustrating practical examples 1 and 2 of the noise suppression in the output from the MR effect element;

DETAILED DESCRIPTION OF THE INVENTION

Figure 1:
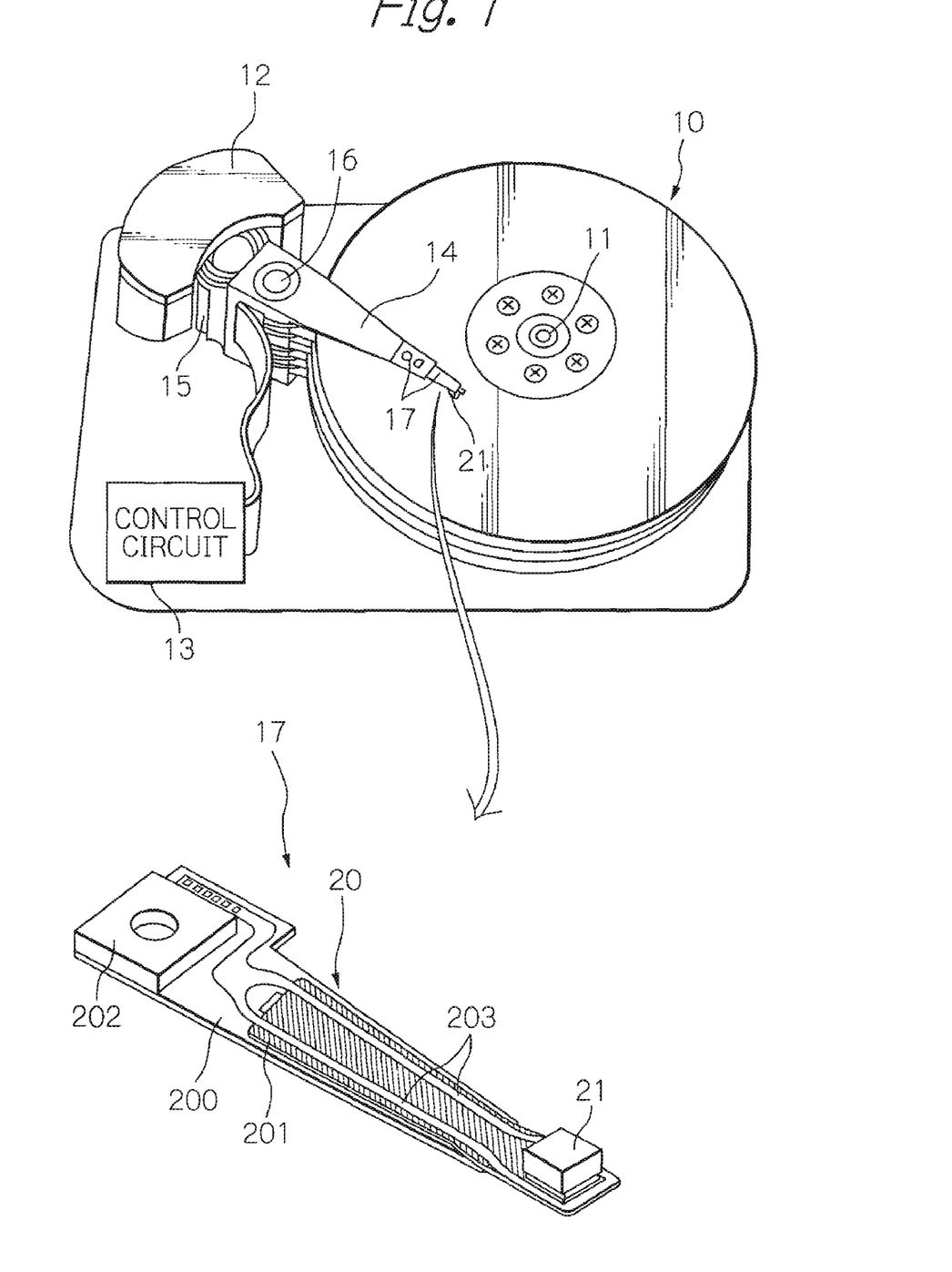
FIG. 1 shows a perspective view schematically illustrating a main part of an embodiment of the magnetic recording and reproducing apparatus used for performing the magnetic reproducing method according to the present invention.

FIG. 1 shows a perspective view schematically illustrating a main part of an embodiment of the magnetic recording and reproducing apparatus used for performing the magnetic reproducing method according to the present invention. In the perspective view of a head gimbal assembly (HGA), the side of the HGA that faces the surface of a magnetic recording medium is shown facing up.

The magnetic recording and reproducing apparatus in FIG. 1 is a magnetic disk drive apparatus. Reference numeral 10 denotes magnetic disks, which are multiple magnetic record media rotating about the spindle of a spindle motor 11, reference numeral 12 denotes an assembly carriage device for positioning a thin-film magnetic head 21 above a track, and reference numeral 13 denotes a recording/reproducing and heating control circuit for controlling read/write operations of the thin-film magnetic head 21 and further controlling heating operation of a heating element for heating the thin-film magnetic head 21.

Provided in the assembly carriage device 12 are multiple drive arms 14. The drive arms 14 are capable of angular-pivoting about a pivot bearing axis 16 driven by a voice coil motor (VCM) 15 and are stacked along the axis 16. An HGA 17 is attached at the end portion of each drive arm 14. Provided on each HGA 17 is a thin-film magnetic head (slider) 21 in such a manner that it faces the surface of each magnetic disk 10. The numbers of magnetic disks 10, drive arms 14, HGAs 17, and thin-film magnetic heads 21 may be one.

Each HGA 17 is constructed by fixing and supporting a thin-film magnetic head 21 on the end portion of a suspension 20 and by connecting one end of a wiring member 203 with signal electrodes and drive electrodes of the thin-film magnetic head 21. The suspension 20 includes: a load beam 200; an flexure 201 having elasticity and fixed on and supported by the load beam 200; a base plate 202 provided on the base of the load beam 200; and a wiring member 203 which is provided on the flexure 201 and consists of lead conductors and connection pads electrically connected to the ends of the lead conductors.

It will be apparent that the structure of the suspension in the HGA 17 of the present invention is not limited to the one described above. While not shown, a head drive IC chip may be attached at some midpoint of the suspension 20.

Figure 2:
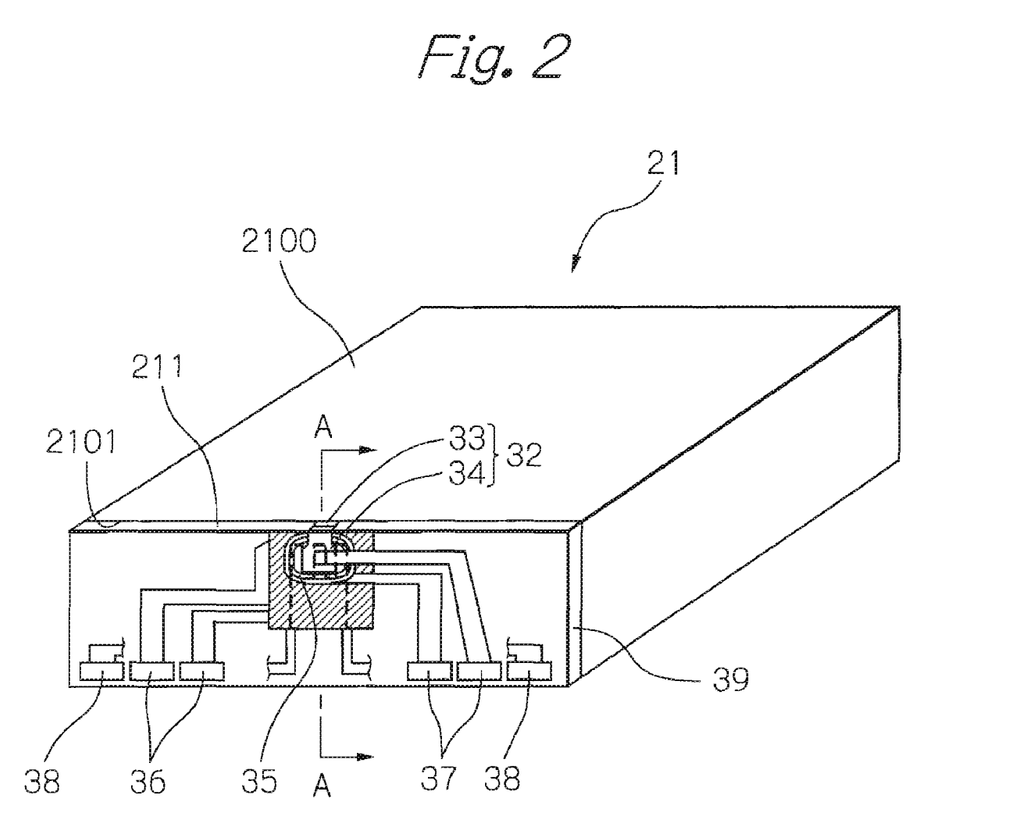
FIG. 2 shows a perspective view illustrating an embodiment of a thin-film magnetic head used for performing the magnetic reproducing method according to the present invention.

FIG. 2 shows a perspective view illustrating an embodiment of a thin-film magnetic head used for performing the magnetic reproducing method according to the present invention.

As shown in FIG. 2, the thin-film magnetic head 21 includes: an air bearing surface (ABS) 2100 processed so as to provide an appropriate flying height; a magnetic head element 32 provided on an element formation surface 2101; a heating element 35 also provided on the element formation surface 2101 for heating the magnetic head element 32; an overcoat layer 39 provided on the element formation surface 2101 so as to cover the magnetic head element 32 and the heating element 35; and pairs of signal electrodes 36 and 37 exposed in the surface of the overcoat layer 39, and two drive electrodes 38. The magnetic head element 32 includes an MR effect element 33 which is a read head element for reading data signals and an electromagnetic coil element 34 which is a write head element for writing data signals. The signal electrodes 36 and 37 are connected to the MR effect element 33 and the electromagnetic coil element 345 respectively. The drive electrodes 38 are connected to the heating element 35.

One end of each of the MR effect element 33 and the electromagnetic coil element 34 reaches a slider end surface 211. The slider end surface 211 is a surface other than the ABS 2100 in the surface opposed to a magnetic disk of the thin-film magnetic head 21, and is mainly composed of the end surface of the overcoat layer 39. One end of each of these elements faces the magnetic disk, and then, reading data signals is performed by sensing signal magnetic fields from the magnetic disk, and writing data signals is performed by applying signal magnetic fields to the magnetic disk.

The heating element 35, which is provided between the MR effect element 33 and the electromagnetic coil element 34 in FIG. 2, is an element used for performing the magnetic reproducing method according to the present invention. The heating element 35 generates heat when electric current is passed through it. The heat generated from the heating element 35 causes the MR effect element 33 having a noise in its output under a low temperature to be increased in temperature, which suppresses the noise of the MR effect element 33.

The heating element 35 may also function as a flying-height adjusting element for adjusting the flying height of the thin-film magnetic head 21 from a magnetic disk 10. In that case, when the heating element 35 generates heat by an electric current applied to it, the magnetic head element 32 thermally expands due to the heat from the heating element 35 or is pushed by the thermal expansion of the material surrounding the magnetic head element 32. As a result, the magnetic head element 32 protrudes toward the disk surface in such a manner that the slider end surface 211 is swelled. The protrusion can be adjusted by controlling the amount of current passed through the heating element 35 to adjust the flying height.

The two drive electrodes 38 connected to the heating element 35 are disposed on both sides of the group of the four signal electrodes 36 and 37. This disposition can prevent crosstalk between the wiring of the MR effect element 33 and the wiring of the electromagnetic coil element 34 as described in Japanese Patent Publication No. 2004-234792A. However, if a certain amount of crosstalk is permissible, each of the two drive electrodes 38 may be disposed between any of the four signal electrodes 36 and 37. The numbers of these electrodes is not limited to those given in the embodiment shown in FIG. 2. While the six electrodes are shown in FIG. 2, only one drive electrode, that is, the five electrodes in total may be provided, and the ground is connected to the slider substrate.

Figure 3A:
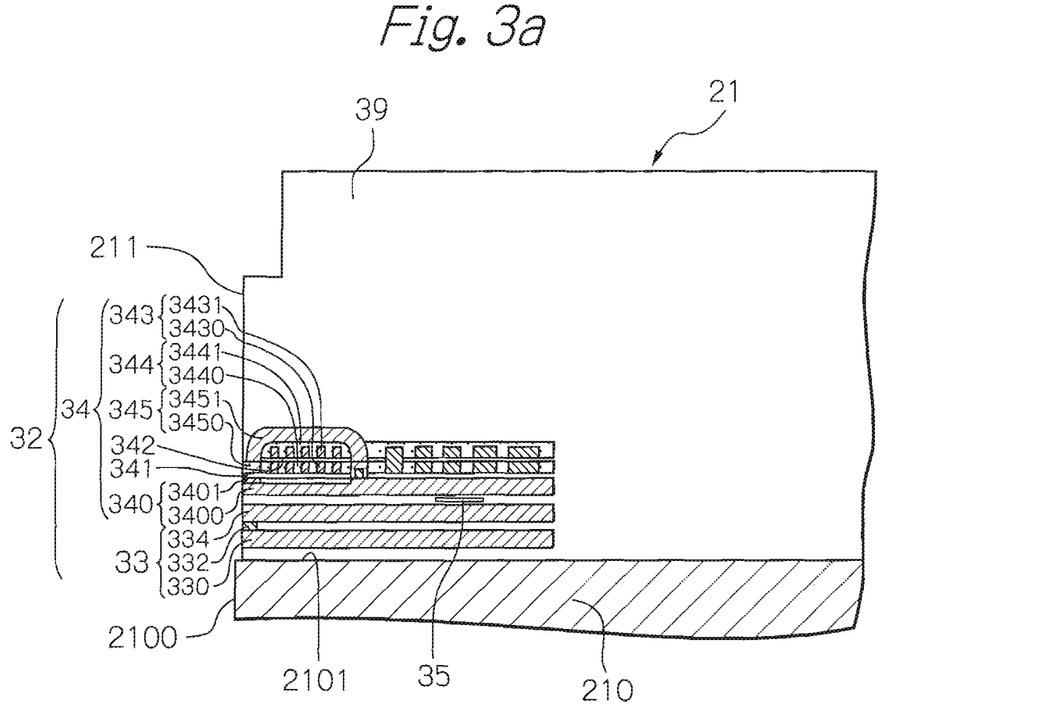
FIG. 3a shows a cross-sectional view taken along line A-A of FIG. 2 illustrating a main portion of a thin-film magnetic head used for performing the magnetic reproducing method according to the present invention.
Figure 3B:
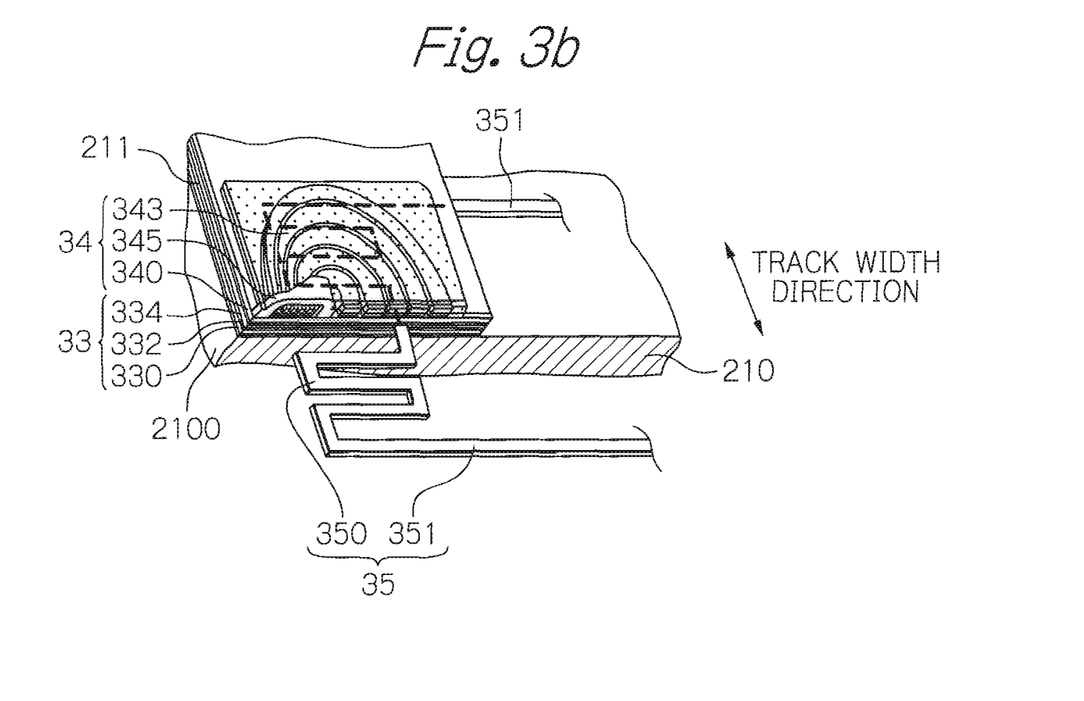

FIG. 3a shows a cross-sectional view taken along line A-A of FIG. 2 illustrating a main portion of a thin-film magnetic head used for performing the magnetic reproducing method according to the present invention. FIG. 3b shows a perspective view including the A-A cross-section.

In FIG. 3a, reference numeral 210 is a slider substrate made of a material such as Altic ($Al_2O_3$—TiC) and having an ABS 2100 which faces the surface of a magnetic disk. The MR effect element 33, the electromagnetic coil element 34, the heating element 35, and the overcoat layer 39 which covers these elements are mainly formed on the element formation surface 2101 which is one side surface of the slider substrate 210 when the ABS 2100 is the bottom.

The MR effect element 33 includes an MR effect multilayer 332 and a lower shield layer 330 and an upper shield layer 334 which sandwich the multilayer 332. The lower shield layer 330 and the upper shield layer 334 may be formed, for example, by pattern plating including frame plating, of a material such as NiFe (Permalloy or the like), CoFeNi, CoFe, FeN or FeZrN with a thickness in the range from approximately 0.5 to approximately 3 µm.

The MR effect multilayer 332 includes a CIP-GMR multilayer film, a CPP-GMR multilayer film or a TMR multiplayer film, and senses a signal magnetic field from a magnetic disk with excellently high sensitivity. The upper and lower shield layers 334 and 330 prevent the MR effect multilayer 332 from being affected by an external magnetic field.

If the MR element multilayer 332 includes a CIP-GMR multilayer film, an insulating upper and lower shied gap layers are provided between the MR element multilayer 332 and the upper and lower shield layers 334 and 330, respectively. And MR lead conductor layers are further formed for supplying a sense current to the MR effect multilayer 332 and for taking a reproduction output. On the other hand, if the MR effect multilayer 332 includes a CPP-GMR multilayered film or a TMR multilayered film, the upper and lower shield layers 334 and 330 also function as upper and lower electrodes, respectively. In this case, the upper and lower shield gap layers and the MR lead conductor layers are not needed and are omitted. An insulating layer, not shown, is formed between the shield layers of the MR multilayer 332 on the side opposite to the head end surface 300. And on both sides of the MR effect multilayer 332 along the track-width direction, insulating layers may be provided, or bias insulating layers and hard bias layers made of a ferromagnetic material may be formed for applying a longitudinal bias magnetic field for stabilizing magnetic domains.

If the MR effect multilayer 332 includes a TMR effect multilayer film, in the case such as practical examples 1 and 2 described in detail later, the multilayer 332 has a structure in which sequentially stacked are, for example: an antiferromagnetic layer made of a material such as IrMn, PtMn, NiMn or RuRhMn with a thickness in the range from approximately 5 to approximately 15 nm; a pinned layer formed of a ferromagnetic material such as CoFe or of two layers made of a ferromagnetic material such as CoFe sandwiching a layer made of a non-magnetic metal such as Ru, and whose magnetization direction is fixed by the antiferromagnetic layer; a tunnel barrier layer made of a nonmagnetic dielectric material formed by oxidizing a film made of a metal such as Al, AlCu or Mg with a thickness of approximately 0.5 to 1 nm with oxygen introduced in a vacuum system or by naturally oxidizing such a metal film; and a free layer having a two-layered structure of a film made of a ferromagnetic material such as CoFe with a thickness of approximately 1 nm and a film made of a ferromagnetic material such as NiFe with a thickness of approximately 3 to 4 nm, and coupled with the pinned layer by tunnel exchange coupling through the tunnel barrier layer.

The electromagnetic coil element 34 is designed for longitudinal magnetic recording and includes a lower magnetic pole layer 340, a write gap layer 341, a write coil layer 343, a write coil insulating layer 344, and an upper magnetic pole layer 345. The write coil layer 343 has a two-layered structure consisting of a lower write coil layer 3430 and an upper write coil layer 3431, and is formed so as to pass in its one turn at least between the lower magnetic pole layer 340 and the upper magnetic pole layer 345. The lower magnetic pole layer 340 and the upper magnetic pole layer 345 forms a guide for a magnetic flux generated by electricity applied to the write coil layer 343.

The lower magnetic pole layer 340 includes: a lower yoke layer 3400; and a lower magnetic pole portion 3401 which is formed on the end portion of the lower yoke layer 3400 on the ABS 2100 side (on the slider end surface 211 side) and reaches the slider end surface 211, and whose upper surface is in contact with the surface of the gap layer 341. The lower yoke layer 3400 is formed, for example, of a material such as NiFe, CoFeNi, CoFe, FeN or FeZrN with a thickness within the range from approximately 0.5 to approximately 3.5 μm by using sputtering or pattern plating including frame plating. The lower magnetic pole portion 3401 is formed, for example, of a material such as NiFe, CoFeNi, CoFe, FeN or FeZrN with a thickness in the range from approximately 0.2 to approximately 0.6 μm by using sputtering. The saturation magnetic flux density of the lower magnetic pole portion 3401 is set higher than that of the lower yoke layer 3400, for example at least 2.0 teslas (T).

The upper magnetic pole layer 345 includes: an upper magnetic pole portion 3450 whose lower surface is in contact with the surface of the write gap layer 341; and an upper yoke layer 3451 whose ABS 2100-side end portion is in surface contact with the upper magnetic pole portion 3450. The upper magnetic pole portion 3450 is formed, for example, of a material such as NiFe, CoFeNi, CoFe, FeN or FeZrN with a thickness in the range from approximately 1 to approximately 3 μm by using sputtering or pattern plating including frame plating. The upper yoke layer 3451 is formed, for example, of a material such as NiFe, CoFeNi, CoFe, FeN or FeZrN with a thickness in the range from approximately 0.5 to approximately 3.0 μm by pattern plating including frame plating. The saturation flux density of the upper magnetic pole portion 3450 is higher than that of the upper yoke layer 3451, for example at least 2.0 T.

The lower magnetic pole portion 3401 and the upper magnetic pole portion 3450 sandwich the end portion of the write gap layer 341 on the ABS 2100 side (on the slider end surface 211 side). A leakage magnetic field from this end portion of the write gap layer 341 causes a writing onto the magnetic disk. Ultra-thin coating of a material such as diamond-like carbon (DLC) is applied to the ends reaching the slider end surface 211 of the lower magnetic pole portion 3401 and upper magnetic pole portion 3450 for protecting the ends.

The write coil insulating layer 344 has a two-layered structure consisting of a lower write coil insulating layer 3440 which surrounds the lower write coil layer 3430 and an upper write coil insulating layer 3441 which surrounds the upper write coil layer 3431. The write coil insulating layer 344 is provided in order to electrically insulating the write coil layer 343 from the upper and lower magnetic pole layers 345 and 340. An upper-lower coil insulating layer 342 is provided between the lower write coil layer 3430 with the lower write coil insulating layer 3440 and the upper write coil layer 3431 with the upper write coil insulating layer 3441 in order to electrically insulate between them. While the write coil layer 343 in FIGS. 3a and 3b has a two-layered structure, it may be a single layer or consist of three or more layers, or a helical coil.

The lower write coil layer 3430 and the upper write coil layer 3431 are formed, for example, of a conductive material such as Cu with a thickness in the range from approximately 0.3 to approximately 5 μm by using frame plating. The lower write coil insulating layer 3440 and the upper write coil insulating layer 3441 are formed, for example, of a resin such as heat-cured photoresist with a thickness in the range from approximately 0.5 to 7 μm by using photolithography. The write gap layer 341 is an insulating layer formed, for example, of a material such as $Al_2O_3$, $SiO_2$, AlN or DLC with a thickness in the range from approximately 0.01 to approximately 0.1 μm by using sputtering or chemical vapor deposition (CVD).

The heating element 35 is provided near the slider end surface 211 between the MR effect element 33 and the electromagnetic coil element 34 as shown in FIG. 3b (and FIG. 3a). The heating element 35 has: a heating line layer 350 which is a line meandered in one layer like a rectangular wave; and two lead line layers 351 connected to both ends of the heating line layer 350. The heating element 35 forms a current path having a given length. One end of each lead line layer 351 is connected to the drive electrode 38 (FIG. 2). The heating element 35 is supplied with electric power for heating by a control circuit described later, through the drive electrode 38. The shape of the heating line layer 350 is not limited to the meander shape. For example, it may be in the shape of a line, a letter U, or spiral.

The heating line layer 350 may have a thickness in the range from approximately 0.1 to 5 μm, and may be formed of a material including NiCu, NiCr, Ta, W, Ti, Cu, Au or NiFe. The lead line layer 351 may be formed of the same material as the heating line layer 350.

Figure 4A:
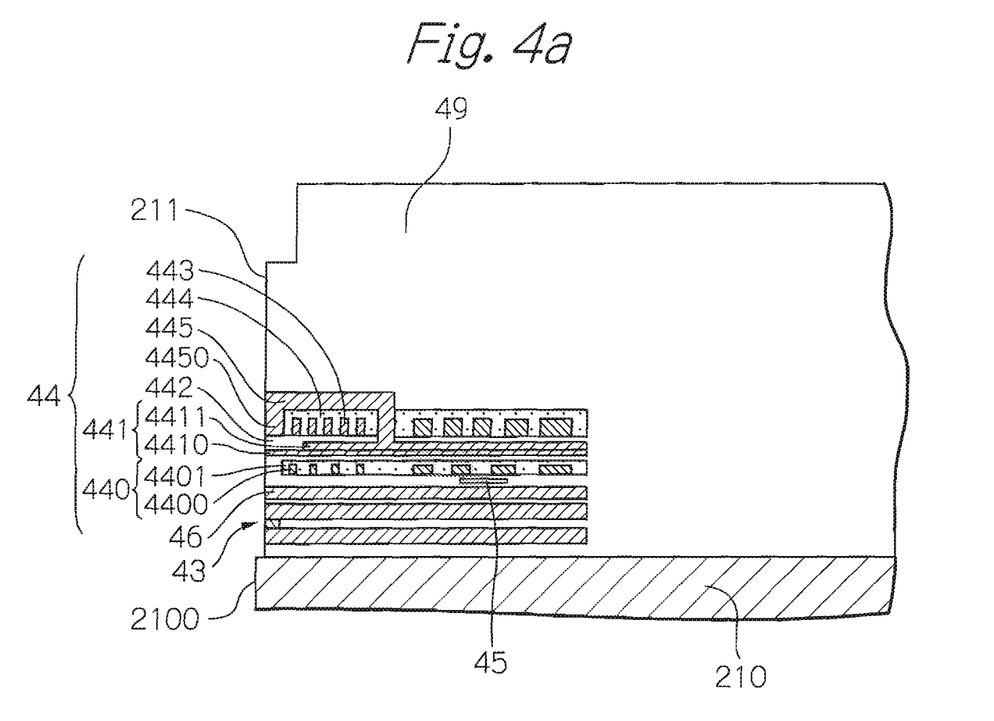
FIGS. 4a and 4b show cross-sectional views taken along line A-A of FIG. 2 illustrating a main portion of another embodiment of a thin-film magnetic head used in performing the magnetic reproducing method according to the present invention.
Figure 4B:
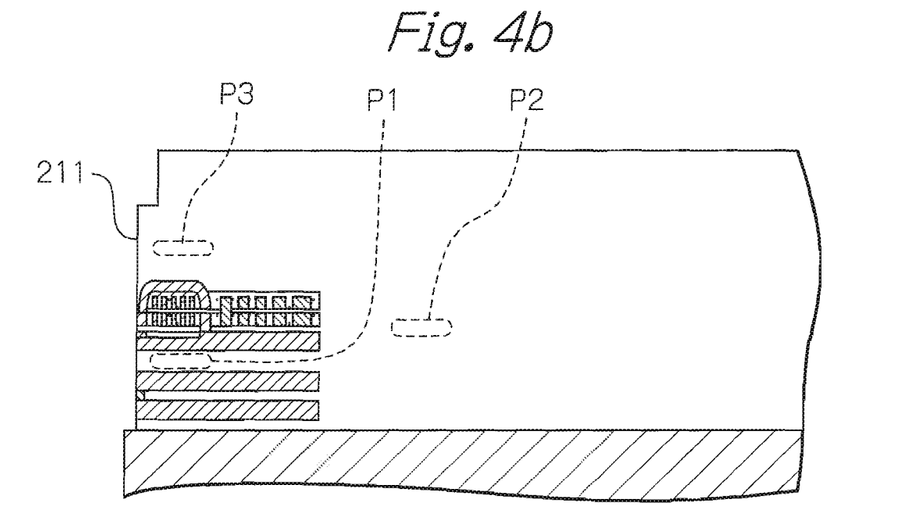

FIGS. 4a and 4b show cross-sectional views taken along line A-A of FIG. 2 illustrating a main portion of another embodiment of a thin-film magnetic head used in performing the magnetic reproducing method according to the present invention.

As shown in FIG. 4a, an electromagnetic coil element 44 is designed for perpendicular magnetic recording, and includes a baking coil portion 440, a main magnetic pole layer 441, a gap layer 442, a write coil layer 443, a write coil insulating layer 444, and an auxiliary magnetic pole layer 445. Provided between the electromagnetic coil element 44 and the MR effect element 43 for reading data signals is an inter-element shield layer 46 that acts as a magnetic shield. A heating element 45 for heating the MR effect element is provided near the slider end surface 211 between the electromagnetic coil element 44 and the inter-element shield layer 46.

The main magnetic pole layer 441 is a magnetic flux guide for converging and guiding a magnetic flux generated by electricity applied to the write coil layer 443 to a perpendicular magnetic record layer of a magnetic disk on which data is to be written, and consists of a main magnetic pole principal layer 4411 and a main magnetic pole support layer 4410. The thickness of the end portion of main magnetic pole layer 441 on the slider end surface 211 side is equivalent to the thickness of the main magnetic pole principal layer 4411, and therefore, is small. As a result, an ultra-fine write magnetic field coping with increased recording density can be generated.

The end portion on the slider end surface 211 side of the auxiliary magnetic pole layer 445 is a trailing shield portion 4450 that has a wider cross-section than the other portions of the auxiliary magnetic pole layer 445. The trailing shield portion 4450 is opposed to the end portion on the slider end surface 211 side of the main magnetic pole layer 441 through the gap layer 442. The provision of the trailing shield portion 4450 makes the magnetic field gradient steeper between the end portion of the trailing shield portion 4450 and the end portion of the main magnetic pole layer 441. As a result, jitter of the signal output becomes smaller, and therefore, the read error rate can be reduced.

The write coil layer 443 is formed so as to pass in its one turn at least between the main magnetic pole layer 441 and the auxiliary magnetic pole layer 445. The write coil insulating layer 444, which surrounds the write coil layer 443, is provided for electrically insulating the write coil layer 443 from the main magnetic pole layer 441 and the auxiliary magnetic pole layer 445.

Further, in the electromagnetic coil element 44, a backing coil portion 440 is provided between the inter-element shield layer 46 (heating element 45) and the main magnetic pole layer 441. The backing coil portion 440 is composed of a baking coil layer 4400 and a backing coil insulating layer 4401 and generates a magnetic flux that cancels a magnetic flux loop that is generated from the main magnetic pole layer 441 and the auxiliary magnetic pole layer 445 and passes through the upper and lower shield layers in the MR effect element 43, in order to prevent Wide Adjacent Track Erasure (WATE) which is unwanted write or erase operation on a magnetic disk.

According to FIG. 4b, the heating element, which is a component of the thin-film magnetic head in any of the embodiments shown in FIG. 3a and FIG. 4a, may be provided in any of positions P1 to P3. The heating element may be provided in a position (P1) near the slider end surface 211 between the MR effect element and the electromagnetic coil element as shown in FIG. 3a and FIG. 4a, or a position (P2) in the overcoat layer opposite to the slider end surface 211 with respect to the magnetic head element, or a position (P3) in the overcoat layer near the slider end surface 211 directly above the electromagnetic coil element. Especially, in the case that the heating element is disposed in position P1, the efficiency of temperature rise of the MR effect element with respect to supplied power will be higher than in the other positions, and therefore, the temperature of the MR effect element can reach a predetermined value with lower supplied power. Further, in this case of position P1, when the heating element also functions as a flying-height adjusting element, the efficiency of protrusion of the end of the magnetic head element will be high, and the protrusion response will be fast.

Figure 5:
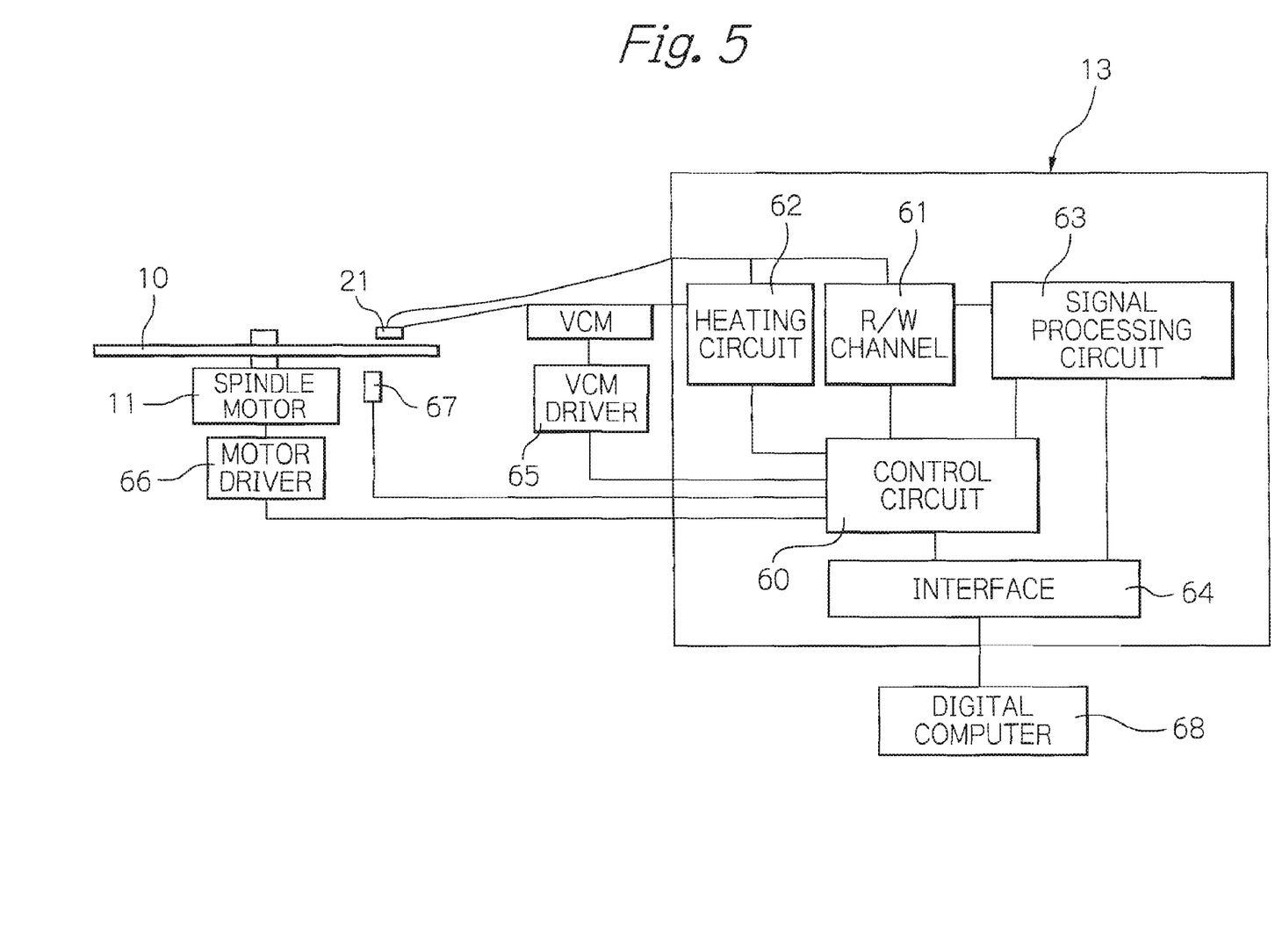
FIG. 5 shows a block diagram illustrating a configuration of the recording/reproduction and heating control circuit provided in the magnetic disk drive apparatus shown in FIG. 1.

FIG. 5 shows a block diagram illustrating a configuration of the recording/reproduction and heating control circuit 13 provided in the magnetic disk drive apparatus shown in FIG. 1.

In FIG. 5, reference numeral 61 denotes an R/W (read/write) channel, reference numeral 62 denotes a heating circuit as a heating-element control means for supplying electric power to the heating element to control the amount of heat applied to the MR effect element, reference numeral 63 denotes a signal processing circuit as an error/noise measuring means for measuring the error rate or noise in the output from the MR effect element, reference numeral 60 denotes a control circuit which is a control means for controlling and causing the R/W channel 61, the heating circuit 62 and the signal processing circuit 63 to operate in conjunction with one another in order to measure the error rate or noise occurring in the output from the MR effect element heated by the heating element, reference numeral 64 denotes an interface, reference numeral 65 denotes a VCM driver for driving a VCM 15, reference numeral 66 denotes a motor driver for driving a spindle motor 11, reference numeral 67 denotes a temperature measurement element, and reference numeral 68 denotes a digital computer.

The recording/reproducing and heating control circuit 13 is composed of the control circuit 60, the R/W channel 61, the heating circuit 62, the signal processing circuit 63, and the interface 64.

In a recording operation, a record data signal from the R/W channel 61 under the control of the control circuit 60 is sent to an electromagnetic coil element in the thin-film magnetic head 21. Then, the thin-film magnetic head 21 writes the data signal on the magnetic disk 10 being rotated by the spindle motor 11 driven by the motor driver 66.

On the other hand, in a reproducing operation, a reproduction data signal read by the MR effect element in the thin-film magnetic head 21 from the rotating magnetic disk 10 is received by the R/W channel 61 under the control of the control circuit 60, and then is sent to the signal processing circuit 63. The read/write positions are appropriately controlled by driving the VCM 15 through the VCM driver 65 under the control of the control circuit 60.

After that, the signal processing circuit 63 processes the received reproduction data signal, and measures a bite error rate (HER). As an alternative, the signal processing circuit 63 may measure the level of noise in the received reproduction data signal. On the measurement of the noise level, a noise count profile (NCP) described later can be used. Then, the BER measured by the signal processing circuit 63 is sent to the digital computer 68 through the interface 64. The digital computer 68 determines whether or not to increase the temperature of the MR effect element by driving the heating element, based on the measured BER.

Here, when the digital computer 68 instructs the control circuit 60 to start heating, a heating current from the heating circuit 62 under the control of the control circuit 60 is sent to the heating element in the thin-film magnetic head 21. The value of the heating current may be controlled with reference to the temperature measured by the temperature measurement element 67 so that the temperature of the MR effect element reaches a predetermined value. The heating current may be a direct current, an alternating current, or a pulse current.

When the temperature of the MR effect element reaches the predetermined value, the reproducing operation described above is started again. And then, the digital computer 68 determines whether or not to increase the temperature of the MR effect element by driving the heating element, based on the measured BER. At last, when the BER becomes less than a predetermined threshold, a series of heating operations is ended, and afterward, performed is a proper reading operation by the MR effect element having a temperature increased to the predetermined value.

Figure 6:
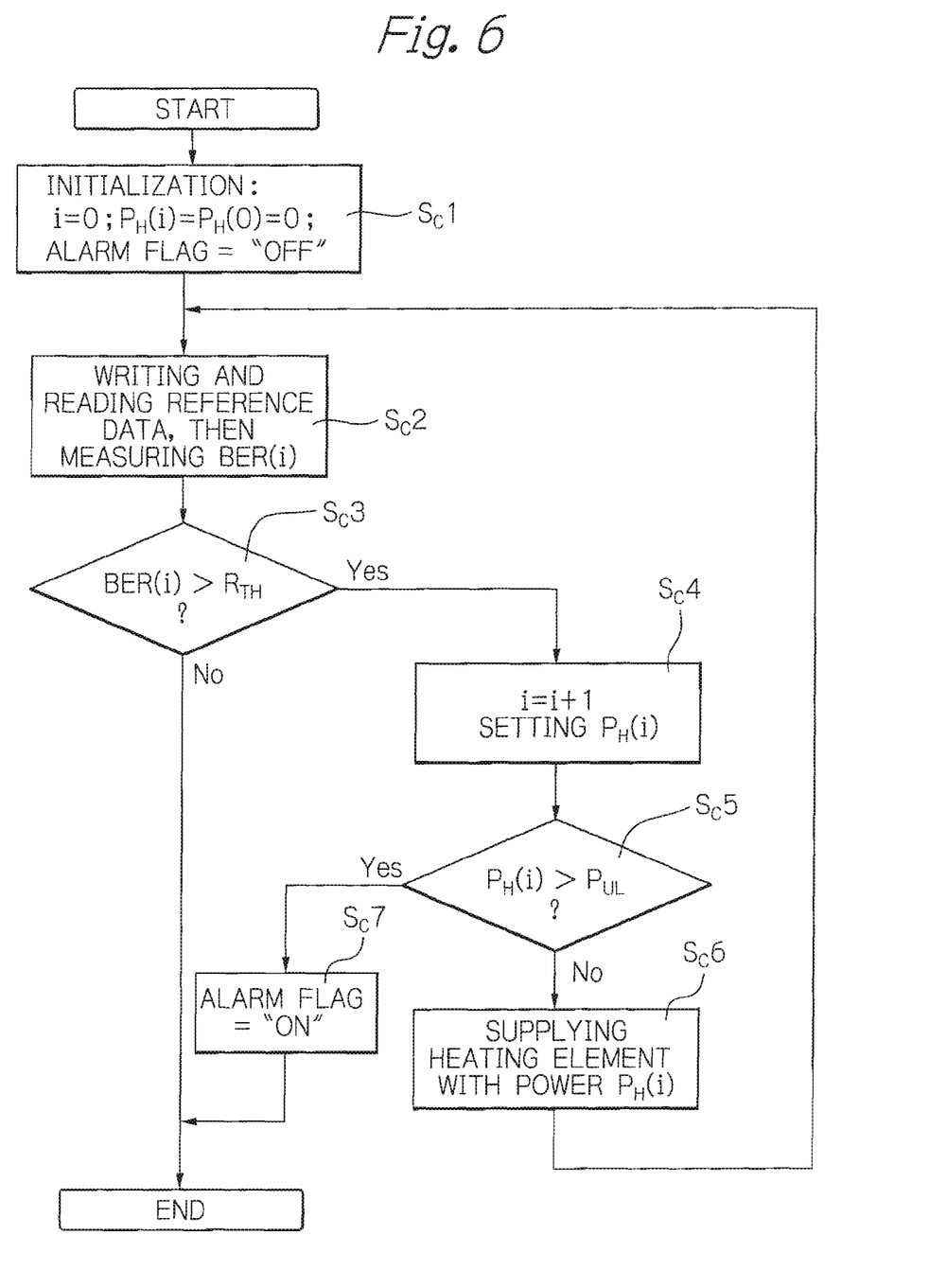
FIG. 6 shows a flowchart illustrating an embodiment of the magnetic reproducing method according to the present invention.

FIG. 6 shows a flowchart illustrating an embodiment of the magnetic reproducing method according to the present invention.

First, as initialization operation, a parameter i and the value of power $P_H(i)$ to be supplied to a heating element are set to i=0 and $P_H(i)=P_H(0)=0$, respectively, in a program executed on the digital computer, and further, an alarm flag is set to OFF (step $S_C1$). Next, an electromagnetic coil element in a thin-film magnetic head is used to write reference data on a predetermined track, and then, the reference data is read by an MR effect element. After that, a signal processing circuit measures BER(0) which is a bite error rate in the output obtained when no electric power is supplied to the heating element, that is, the power value $P_H(i)=0$ (step $S_C2$).

Next, determination is made as to whether the measured BER(i) is greater than a predetermined threshold $R_{TH}$ (step $S_C3$). The threshold $R_{TH}$ may be set in the program on the digital computer on the basis of a requirement for BER by taking into consideration the specifications and performance of the in-use magnetic recording and reproducing apparatus. For example, the threshold $R_{TH}$ may be in the range between $1\times10^{-6}$ and $1\times10^{-5}$.

If it is determined that BER(i) is larger than the threshold $R_{TH}$, the value of $P_H(i)$ is set as to be i=i+1 (step $S_C4$). The value $P_H(i)$ here is appropriately set in the program on the digital computer by taking into consideration a rise in the temperature of the MR effect element caused by heat generation by the heating element.

Then, determination is made as to whether $P_H(i)$ is greater than a predetermined threshold $P_{UL}$ (step $S_C5$). The threshold $P_{UL}$ is appropriately set by taking into consideration the upper limit of rise in the temperature of the MR effect element caused by heat generation by the heating element. For example, the threshold $P_{UL}$ may be in the range between 10 and 50 mW. Unless $P_H(i)$ is greater than the threshold $P_{UL}$, the electric power equal to the power value $P_H(i)$ is supplied to the heating element (step $S_C6$). As a result, the temperature of the MR effect element increases to a predetermined value. After that, returning to step $S_C2$, the reference data is read by the MR effect element, and then, the signal processing circuit measures BER(i) in the output obtained when the electric power equal to the power value $P_H(i)$ is supplied to the heating element. Here, the measurement of BER(i) can be started after a time required for the temperature of the MR effect element to reach a predetermine temperature, elapsed since the start of supplying the electric power of $P_H(i)$ to the heating element (step $S_C6$). Of course, the condition necessary to start the measurement of BER(i) is that the MR effect element has actually reached a predetermined temperature regardless of the time during which the MR effect element is anticipated to reach the predetermined temperature.

Next, determination is made once again as to whether the measured BER(i) is greater than the predetermined threshold $R_{TH}$ (step $S_C3$). Then, the above-described steps from step $S_C4$ are repeated until if it is determined that BER(i) becomes equal to or less than the predetermined threshold $R_{TH}$. When BER(i) is determined to become equal to or less than the predetermined threshold $R_{TH}$, the whole steps described above are ended, and afterward, performed is a reading operation by the MR effect element under the condition of supplying the electric power of $P_H(i)$.

Further, if it is determined that $P_H(i)$ exceeds the threshold $P_{UL}$, the alarm flag is set to ON (step $S_C7$), and the whole steps described above are also ended. In the case, given is a notice that the read head element is in a defective condition. The notice may be performed by, for example, indicating the notice on the display of the digital computer.

With use of the above-described magnetic reproducing method, an MR effect element for reading data signals can be properly increased in temperature by supplying electric power to a heating element under control, in the thin-film magnetic head including the MR effect element having a noise in its output under a low temperature. As a result, excellent read characteristic can be obtained even in the use environment with the low temperature. That is, the error rate of the magnetic recording and reproducing apparatus is reduced in the use environment with the low temperature, and improved is the reliability of the apparatus.

Practical Examples

Hereinafter, practical examples of the magnetic reproducing method will be explained.

In the practical examples, a magnetic disk drive apparatus provided with a thin-film magnetic head for longitudinal magnetic recording was used under the use environment with 5° C., and the reproducing operation explained using FIG. 6 was performed in the apparatus. The MR effect element in the head was a TMR effect element explained using FIG. 3a. The threshold $R_{TH}$ of BER(i) in FIG. 6 was set to be $1\times10^{-6}$.

Figure 7:
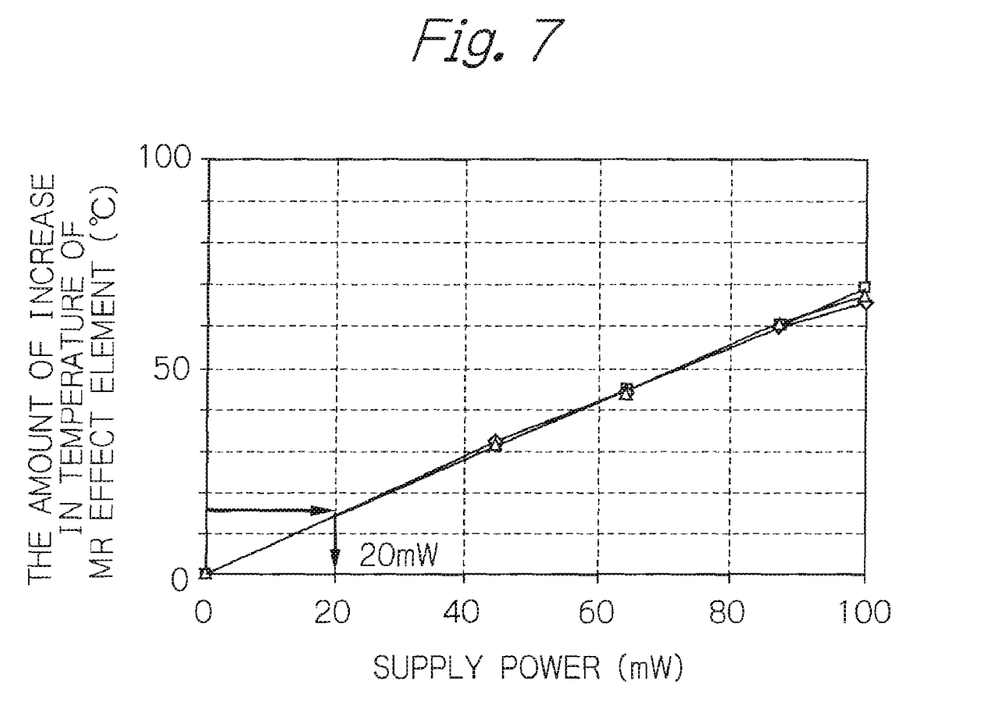
FIG. 7 shows a graph illustrating the relation between the supplied power to the heating element and the temperature increase of the MR effect element, in the magnetic disk drive apparatus used in the practical examples.

FIG. 7 shows a graph illustrating the relation between the supplied power to the heating element and the temperature increase of the MR effect element, in the magnetic disk drive apparatus used in the practical examples.

As shown in FIG. 7, when electric power was supplied to the heating element while the thin-film magnetic head was flying above a rotating magnetic disk (in the normal write or read state), the efficiency of temperature rise (the slope of the line in the graph) was 0.35° C./mW.

Meanwhile, in the present practical examples, the temperature of the use environment of the magnetic disk drive apparatus was 5° C., however, the final value $P_H(i)$ in the flowchart shown in FIG. 6 became 20 mW. That is, the final supplied power to the heating element was 20 mW. As a result, the final temperature of the MR effect element was 12° C. as the result of increase by 7° C. Usually, the final value $P_H(i)$ is in the range between approximately 10 to 50 mW, which is within an acceptable range of supplied power when the heating element is used as a flying-height adjusting element. Therefore, the final value $P_H(i)$ can be determined under further taking into consideration the adjustment of the flying height.

FIGS. 8a1 to 8b2 show graphs illustrating practical examples 1 and 2 of the noise suppression in the output from the MR effect element.

Figure 8A:
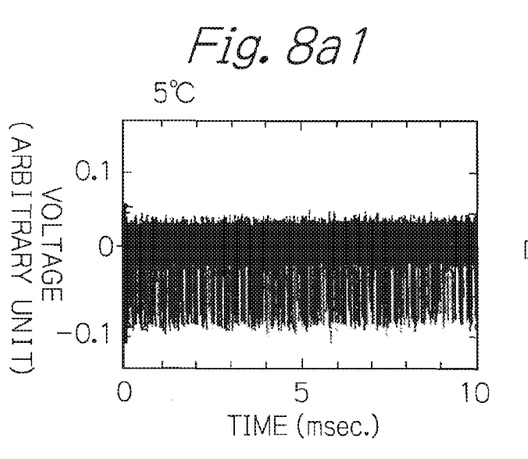
Figure 8A:
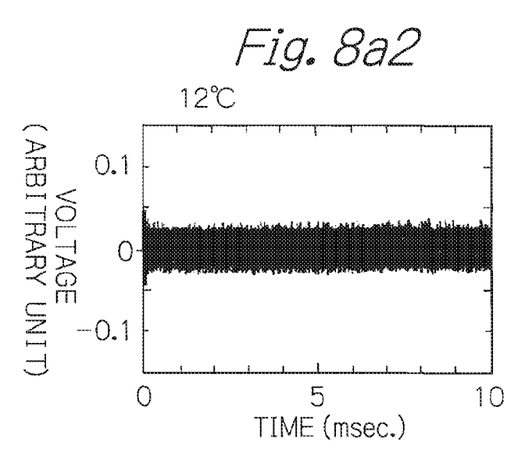
Figure 8B:
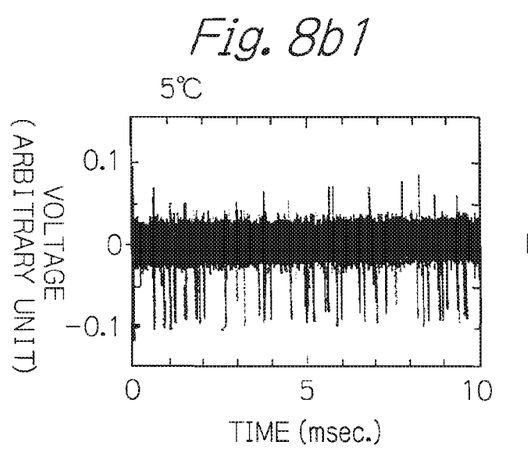
Figure 8B:
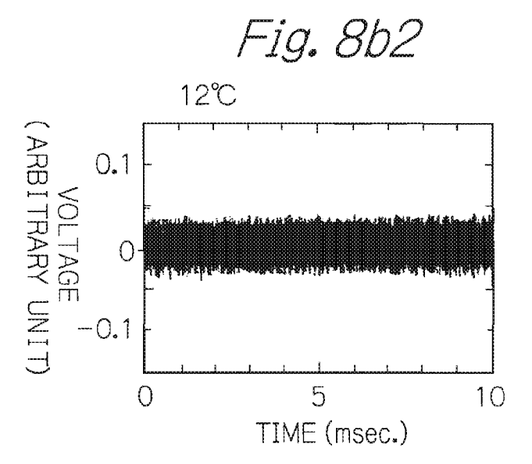

In practical example 1 shown in FIGS. 8a1 and 8a2, first, the MR effect element had considerable noise at a low temperature of 5° C. Then, when the temperature of the MR effect element was increased to 12° C. by supplying electric power of 20 mW to the heating element, suppressed was the noise that had been generated due to the low temperature. In practical example 1, the considerable noise occurring on both sides of the envelope of the output waveform was suppressed. On the other hand, in practical example 2 shown in FIG. 8b1 and 8b2, the noise occurring mainly on one side of the envelope at 5° C. was suppressed at 12° C. Anyway, it is understood that increasing the temperature of the MR effect element to a adequate one by supplying electric power to the heating element can bring such an excellent output with noise suppressed.

In fact, the BER was reduced from $1 \times 10^{-3}$ to $1 \times 10^{-7}$ in practical example 1, and from $1 \times 10^{-4}$ to $1 \times 10^{-8}$ in practical example 2. That is, in both practical examples, the BERs were improved to become less than the above described threshold $R_{TH} = 1 \times 10^{-6}$. Here, these improved values of BER surely satisfy the conditions required by taking into consideration specifications, performance and so on of the magnetic recording and reproducing apparatuses used for practical examples 1 and 2. However, it should be noticed that the absolute value of these BERs depends on the in-use apparatus. Therefore, extensive improvement of BER is one of effects of the present invention.

Further, the lower limit of the operating temperature of the magnetic disk drive apparatus is usually set to be equal to or less than 0° C. However, it is experimentally seen that a noise due to low temperature is observed in the output of the MR effect element at a temperature between the lower limit and 5° C. In this case, it is preferable that, after confirming that the temperature measured by a temperature-measuring element is within a range of temperature, for example, between the lower limit and 5° C., the magnetic reproducing method described above is performed. Further, the achieved temperature when heating the MR effect element by supplying electric power to the heating element is experimentally known to be preferably in the range from 10° C. to 30° C., under the consideration of the temperature variation.

Hereinafter, the levels of noise in the above-described outputs of examples 1 and 2 will be evaluated.

In the present embodiment, a noise count profile (NCP) is used as an indicator of the level of noise. The NCP is an enhanced representation of the level of noise in the output of the MR effect element. Specifically, the NCP is represented on a graph having a horizontal axis representing (normalized) threshold voltage and a vertical axis representing (normalized) noise count, as will be described below, and is a characteristic representation very convenient for evaluating the level of noise.

Figure 9A:
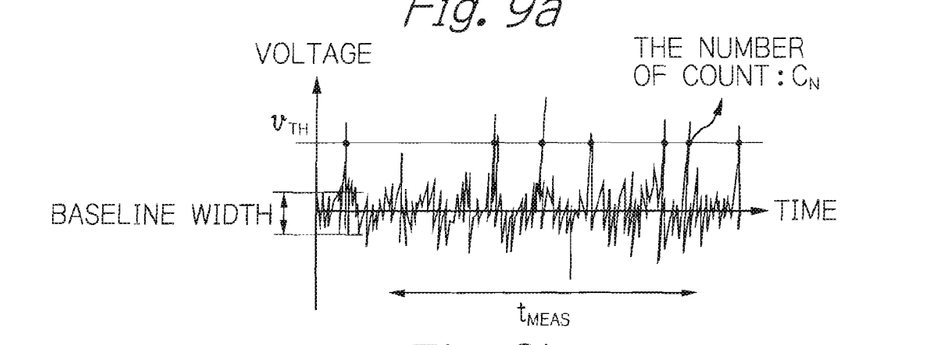
FIGS. 9a to 9c show graphs for explaining a NCP for evaluating the levels of noise in the outputs of the MR effect elements of practical examples 1 and 2.
Figure 9B:
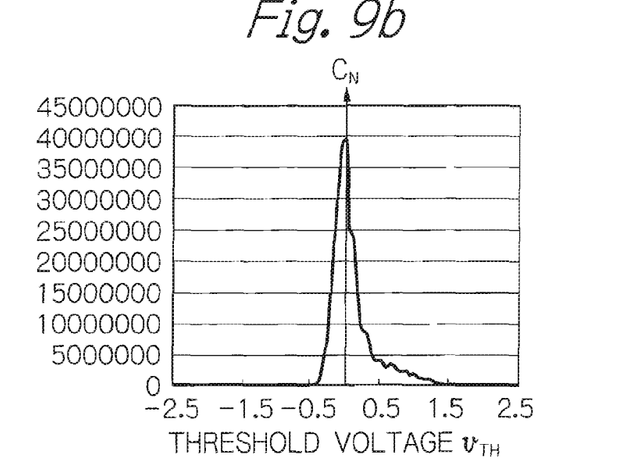
Figure 9C:
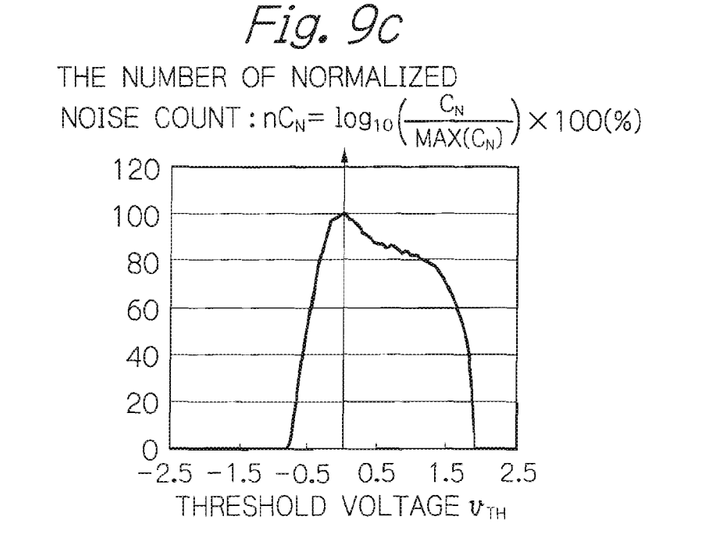

FIGS. 9a to 9c show graphs for explaining a NCP for evaluating the levels of noise in the outputs of the MR effect elements of practical examples 1 and 2.

In the NCP measurement, the output from the MR effect element is first passed through a wideband amplifier to cancel a DC component, and a signal with a predetermined bandwidth is extracted. FIG. 9a shows the signal represented by a graph having a horizontal axis representing time and a vertical axis representing voltage. Referring to FIG. 9a, spikes of noise protruding from a baseline having a predetermined width are shown.

A threshold voltage $v_{TH}$ for the signal shown in FIG. 9a is set, and counted is the number $C_N$ of times with which the signal shown in FIG. 9a crossed the threshold voltage $v_{TH}$ in a predetermined period of time $T_{MEAS}$ (for example 500 milliseconds). Then, different threshold voltages $V_{TH}$ are set and the number $C_N$ of times with which the signal crossed each threshold voltage $V_{TH}$ is counted. FIG. 9b is a graph, thus obtained, of threshold voltage $V_{TH}$ versus the number $C_N$ of times with which the signal crossed the threshold voltages $v_{TH}$. The width of the profile curve shown in FIG. 9b basically corresponds to the width of the baseline in FIG. 9a. When noise exists in the signal, the profile curve will have a skirt or shoulder.

In FIG. 9b, an order-of-magnitude increase of the number $C_N$ appears and the curve protrudes around 0 V, and the presence of noise is obscured in the graph. FIG. 9c shows a graph having a vertical axis that avoids this problem. The vertical axis of the graph shown in FIG. 9c represents a normalized number of noise counts $nC_N$ obtained by calculating the logarithm of the value and normalizing the resulting value at 0 V as 100%, that is, $\log_{10}(C_N/\mathrm{MAX}(C_N)) \times 100(\%)$. As a result, the frequency and magnitude of popping noise are clearly represented on the graph and the noise characteristic can be readily evaluated. The characteristic shown in FIG. 9c is the NCP.

Figure 10A:
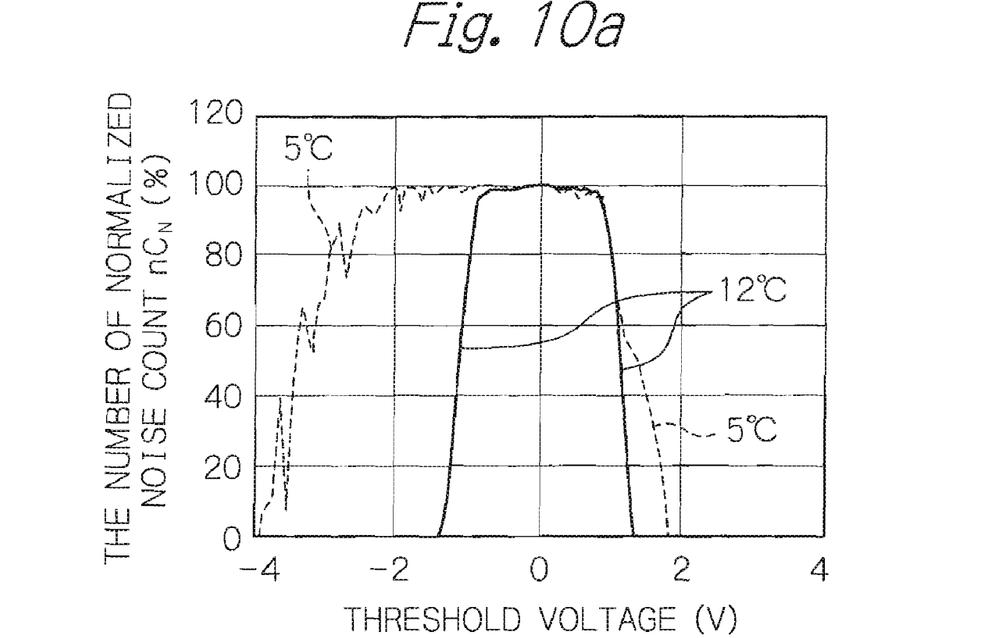
FIGS. 10a and 10b show the NCPs in practical examples 1 and 2 shown in FIGS. 8a1 to 8b2.
Figure 10B:
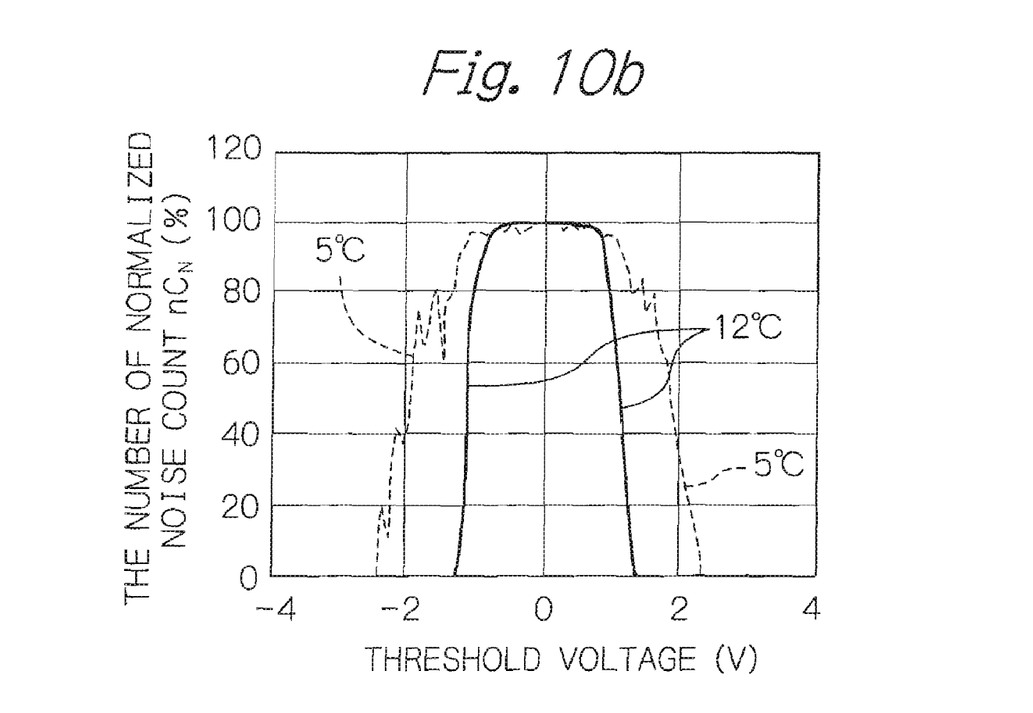

FIGS. 10a and 10b show the NCPs in practical examples 1 and 2 shown in FIGS. 8a1 to 8b2.

FIG. 10a is the measurement result of the NCPs in the outputs shown in FIGS. 8a1 and 8a2 (practical example 1). FIG. 10b is the measurement result of the NCPs in the outputs shown in FIGS. 8b1 and 8b2 (practical example 2). The horizontal axis of FIGS. 10a and 10b represents a threshold voltage $v_{TH}$ (V), and the vertical axis of the figures represents a normalized number of noise counts $nC_N$ (%).

As shown FIG. 10a, the profile curve had a shoulder only in one direction (in the negative direction in this figure) along the horizontal axis and was generally asymmetric, reflecting that noises occurred at first mainly on one side of the envelope of the output waveform at 5° C. Next, when the MR effect element is heated up to 12° C., the profile curve had a trapezoidal shape with steep side edges, showing that the noise was sufficiently suppressed. On the other hand, in FIG. 10b, the profile curve had shoulders on both sides along the horizontal axis and was symmetric and wide, reflecting that many noises occurred at first on both sides of the envelope of the output waveform at 5° C. Next, when the MR effect element is heated up to 12° C., the profile curve also had a trapezoidal shape with steep side edges, showing that the noise was sufficiently suppressed.

As just described, it can be seen that the NCP properly reflects the level of problematic noise, and in a thin-film magnetic head including a head element for reading data signals which generates a noise in a low temperature, an excellent read characteristic in which the noise is suppressed can be obtained by performing the magnetic reproducing method according to the present invention.

All the foregoing embodiments are by way of example of the present invention only and not intended to be limiting, and many widely different alternations and modifications of the present invention may be constructed without departing from the spirit and scope of the present invention. Accordingly, the present invention is limited only as defined in the following claims and equivalents thereto.

The invention claimed is:

1. A magnetic reproducing method comprising the steps of:
heating a magnetoresistive effect element for reading data signals, and having an output with a Barkhausen noise due to a low temperature of said magnetoresistive effect element; and
performing a read operation by using said magnetoresistive effect element under condition that said magnetoresistive effect element is increased in temperature and thus the Barkhausen noise is reduced, wherein the output of said magnetoresistive effect element is measured, and said magnetoresistive effect element is heated until the Barkhausen noise in the measured output is reduced, while a thin-film magnetic head comprising said magnetoresistive effect element is flying above a rotating magnetic recording medium, the Barkhausen noise being judged to be reduced when a noise count profile of the measured output of the magnetoresistive effect element has substantially a trapezoidal shape, the noise count profile representing a relation between a normalized value $nC_N$ of noise counts $C_N$ and a normalized value of $nv_{TH}$ of threshold voltages $v_{TH}$, where $C_N$ is the number of times that a noise signal crosses each of different set threshold voltages $v_{TH}$ in a predetermined period of time $T_{MEAS}$.

2. The magnetic reproducing method as claimed in claim 1, wherein said magnetoresistive effect element is a tunnel magnetoresistive effect element.

3. The magnetic reproducing method as claimed in claim 1, wherein said magnetoresistive effect element is heated by generating heat from a heating element provided within a thin-film magnetic head comprising said magnetoresistive effect element.

4. The magnetic reproducing method as claimed in claim 3, wherein said heating element is provided between a head element for writing data signals comprised by said thin-film magnetic head and said magnetoresistive effect element.

5. The magnetic reproducing method as claimed in claim 1, wherein a temperature before heating of said magnetoresistive effect element is in a range from a lower limit of operating temperature to 5° C.

6. A magnetic recording and reproducing apparatus comprising at least one thin-film magnetic head comprising:

a magnetoresistive effect element for reading data signals; and a heating element for heating said magnetoresistive effect element to increase a temperature of said magnetoresistive effect element and reduce an error rate or a Barkhausen noise due occurring in an output of said magnetoresistive effect element due to a low temperature of said magnetoresistive effect element, and said magnetic recording and reproducing apparatus further comprising:

at least one magnetic recording medium;

an error/noise measuring means for measuring the error rate or the Barkhausen noise in the output of said magnetoresistive effect element;

a heating-element control means for supplying electric power to said heating element to control an amount of heat applied to said magnetoresistive effect element; and a control means for controlling said error/noise measuring means and said heating-element control means to operate in conjunction with each other, in order to measure the error rate or the Barkhausen noise occurring in the output of said magnetoresistive effect element heated by said heating element while said thin-film magnetic head is flying above the rotating magnetic recording medium, wherein said heating element is providing for heating said magnetoresistive effect element until the error rate or the Barkhausen noise in the output of said magnetoresistive effect element is reduced, while said thin-film magnetic head is flying above the rotating magnetic recording medium, the error rate or the Barkhausen noise being judged to be reduced when a noise count profile of the output of the magnetoresistive effect element measured by said error/noise measuring means has substantially a trapezoidal shape, the noise count profile representing a relation between a normalized value $nC_N$ of noise counts $C_N$ and a normalized value of $nv_{TH}$ of threshold voltages $v_{TH}$ where $C_N$ is the number of times that a noise signal crosses each of different set threshold voltages $v_{TH}$ in a period of time $T_{MEAS}$.

7. The magnetic recording and reproducing apparatus as claimed in claim 6, wherein said thin-film magnetic head further comprises an electromagnetic coil element for writing data signals, and said heating element is provided between said electromagnetic coil element and said magnetoresistive effect element.

8. The magnetic recording and reproducing apparatus as claimed in claim 6, wherein said magnetoresistive effect element is a tunnel magnetoresistive effect element.

* * * * *